US011133559B2

United States Patent
Hu et al.

(10) Patent No.: US 11,133,559 B2
(45) Date of Patent: Sep. 28, 2021

(54) POLYMER COMPOSITE MEMBRANE, FABRICATION METHOD THEREFOR, AND LITHIUM-ION BATTERY

(71) Applicant: BYD COMPANY LIMITED, Guangdong (CN)

(72) Inventors: Jialing Hu, Shenzhen (CN); Jun Shan, Shenzhen (CN); Long He, Shenzhen (CN)

(73) Assignee: BYD COMPANY LIMITED

( * ) Notice: Subject to any disclaimer, the term of this patent is extended or adjusted under 35 U.S.C. 154(b) by 157 days.

(21) Appl. No.: 16/474,992

(22) PCT Filed: Dec. 1, 2017

(86) PCT No.: PCT/CN2017/114316
§ 371 (c)(1),
(2) Date: Jun. 28, 2019

(87) PCT Pub. No.: WO2018/121180
PCT Pub. Date: Jul. 5, 2018

(65) Prior Publication Data
US 2019/0326577 A1 Oct. 24, 2019

(30) Foreign Application Priority Data
Dec. 30, 2016 (CN) .......................... 201611262160.9

(51) Int. Cl.
*H01M 50/44* (2021.01)
*B01D 69/14* (2006.01)
(Continued)

(52) U.S. Cl.
CPC ............ *H01M 50/44* (2021.01); *B01D 69/14* (2013.01); *B01D 71/34* (2013.01); *B01D 71/40* (2013.01);
(Continued)

(58) Field of Classification Search
None
See application file for complete search history.

(56) References Cited

U.S. PATENT DOCUMENTS

| 2008/0057389 A1* | 3/2008 | Kono | ................... B01D 71/26 429/144 |
| 2012/0141858 A1* | 6/2012 | Chung | ................... C08J 7/0427 429/144 |

FOREIGN PATENT DOCUMENTS

| CN | 101511589 A | 8/2009 |
| CN | 102487131 A | 6/2012 |

(Continued)

OTHER PUBLICATIONS

International Search Report and Written Opinion for PCT Application No. PCT/CN2017/114316, dated Mar. 1, 2018, 8 pages.

*Primary Examiner* — Daniel S Gatewood

(57) ABSTRACT

A polymer composite membrane, a method for fabricating same, and a lithium-ion battery including same are provided. The polymer composite membrane includes a porous base membrane and a heat-resistant layer covering at least one side surface of the porous base membrane, the heat-resistant layer includes a plurality of heat-resistant sub-layers sequentially stacked, and pore-blocking temperatures of the heat-resistant sub-layers are sequentially increased from inside to outside; each of the heat-resistant sub-layers includes at least one of a first heat-resistant polymer material and a second heat-resistant polymer material, and each of the heat-resistant sub-layers is separately configured as a fiber network structure; the melting point of the first heat-resistant polymer material is not less than 200° C.; and the melting point of the second heat-resistant polymer material is not less than 100° C.

19 Claims, 3 Drawing Sheets

(51) Int. Cl.
   *B01D 71/34* (2006.01)
   *B01D 71/40* (2006.01)
   *H01M 10/0525* (2010.01)
   *H01M 50/411* (2021.01)
   *H01M 50/403* (2021.01)

(52) U.S. Cl.
   CPC ..... *H01M 10/0525* (2013.01); *H01M 50/403* (2021.01); *H01M 50/411* (2021.01); *B01D 2323/28* (2013.01); *B01D 2323/39* (2013.01); *B01D 2325/02* (2013.01); *B01D 2325/04* (2013.01)

(56) References Cited

FOREIGN PATENT DOCUMENTS

| | | | |
|---|---|---|---|
| CN | 103531736 A | * | 1/2014 |
| CN | 103531736 A | | 1/2014 |

* cited by examiner

POLYMER COMPOSITE MEMBRANE, FABRICATION METHOD THEREFOR, AND LITHIUM-ION BATTERY

CROSS-REFERENCE TO RELATED APPLICATIONS

This application is a national phase application of International Application No. PCT/CN2017/114316, filed on Dec. 1, 2017, which is based on and claims priority to and benefits of Chinese Patent Application No. 201611262160.9, filed with the State Intellectual Property Office of P. R. China on Dec. 30, 2016. The entire content of all of the above-referenced applications is incorporated herein by reference.

FIELD

The present specification relates to the field of lithium-ion batteries, and specifically, to a polymer composite membrane, a method for fabricating same, and a lithium-ion battery in which the foregoing polymer composite membrane is used.

BACKGROUND

A lithium-ion battery is mainly formed by a positive (anode)/negative (cathode) electrode material, an electrolyte, a membrane, and a battery case packaging material. The membrane is an important component of the lithium-ion battery, which is configured to play a role of separating the anode and cathode, to prevent the battery from being internally short-circuited, and allow ions of the electrolyte to pass freely to complete an electrochemical charge/discharge process. The performance of the membrane determines the interface structure, the internal resistance, and the like of the battery, and directly affects characteristics of the battery such as the rate performance, the cycle performance, and the safety (the high-temperature resistance performance). A membrane with an excellent performance plays an important role of improving the comprehensive performance of a battery, and is referred to as a "third electrode" of the battery in the industry.

In recent years, membrane researchers and developers focus on the safety of the membrane and particularly high-temperature stability and reporting the related researches. For example, Patent Application No. CN201410453322 discloses a composite membrane applied to a lithium-ion battery and a lithium-ion battery including the membrane. The related composite membrane applied to a lithium-ion battery includes: (a) a porous substrate having pores; and (b) an organic/inorganic composite layer formed by coating at least one surface of the porous substrate or some surface areas of the porous substrate with a mixture containing inorganic particles, one or more polymer binders selected from polyetherimide, polyaryletherketone, and poly(m-phenylene isophthalamide), and an optional high-temperature pore-blocking material. The inorganic particles are connected to each other and are fixed with the polymer binder, and gaps among the inorganic particles may form the pores. Preferably, respective intrinsic viscosities of the polyetherimide, the polyaryletherketone, and the poly (m-phenylene isophthalamide) are 0.2 dl/g to 0.9 dl/g.

However, in the foregoing technical solution, a large contradiction exists between the viscosity of the organic/inorganic composite layer and the porous substrate layer and the air permeability of the composite membrane. The reason may be as follows: this organic/inorganic composite layer is formed in a coating manner, and pores are formed depending on the gaps among the inorganic particles. For improving the porosity (air permeability) of the organic/inorganic composite layer, the usage amount of the polymer binder needs to be reduced. However, because the glass transition temperature of the foregoing polymer binder is higher, the viscosity of the polymer binder is not good. Once the usage amount of the polymer binder is reduced, the bonding performance between the coating and the substrate layer is reduced, resulting in a degraded high-temperature thermal stability of this composite membrane.

Moreover, the melting temperature of the high-temperature pore-blocking material and the melting temperature of the substrate basically fall within one range. Therefore, when the internal temperature of a lithium battery reaches this range because the battery is short-circuited, both the high-temperature pore-blocking material and the substrate are melted together to block the pores between the ceramic particles. As a result, the battery reaction stops. However, when the internal temperature of the battery is increased, excessive heat or local excessive heat usually occurs. In this case, the melted composite membrane may be fractured due to impact from a high temperature, and pores may also occur due to contraction of the polymer (which is referred to as a pore unblocking phenomenon), to cause an internal short-circuit of the battery. As a result, a thermal failure of the membrane may occur. This is also an important reason why the safety of the current lithium-ion battery at a high temperature (above 160° C. to 180° C.) is not improved much.

SUMMARY

An objective of the present specification is to provide a polymer composite membrane, a method for fabricating the polymer composite membrane, and a lithium-ion battery including the polymer composite membrane, to improve the high-temperature stability of the polymer composite membrane, and the use safety of the lithium-ion battery at a high temperature.

To achieve the objective, according to a first aspect of the present specification, a polymer composite membrane is provided, wherein the polymer composite membrane includes a porous base membrane and a heat-resistant layer covering at least one side surface of the porous base membrane. The heat-resistant layer includes a plurality of sequentially stacked heat-resistant sub-layers, and pore-blocking temperatures of the heat-resistant sub-layers are sequentially increased from inside to outside. Each of the heat-resistant sub-layers includes at least one of a first heat-resistant polymer material and a second heat-resistant polymer material, and each of the heat-resistant sub-layers is separately configured as a fiber network structure. The melting point of the first heat-resistant polymer material is not less than 200° C., and the melting point of the second heat-resistant polymer material is not less than 100° C.

According to a second aspect of the present specification, a method for fabricating a polymer composite membrane is provided. The fabrication method includes the following steps: Step S1, providing a polymer base membrane; and Step S2, forming precursors of a plurality of heat-resistant sub-layers sequentially superposed on at least one side surface of the polymer base membrane through an electrostatic spinning method using a spinning solution containing a first heat-resistant polymer material and/or a second heat-resistant polymer material, drying, and removing a solvent to obtain a heat-resistant layer including the plurality of heat-resistant sub-layers. The melting point of the first heat-resistant polymer material is not less than 200° C., the melting point of the second heat-resistant polymer material is not less than 100° C., and pore-blocking temperatures of the heat-resistant sub-layers are sequentially increased from inside to outside along the heat-resistant layer.

According to a third aspect of the present specification, a polymer composite membrane prepared by using the foregoing method according to the present specification is provided.

According to a fourth aspect of the present specification, a lithium-ion battery is provided, wherein the lithium-ion battery includes an anode, a cathode, and a battery membrane located between the anode and the cathode, and the battery membrane is the polymer composite membrane according to the present specification.

The polymer composite membrane, the method for fabricating same, and the lithium-ion battery including same according to the technical solutions of the present specification has the following advantages.

(1) The heat-resistant layer is formed by the plurality of heat-resistant sub-layers having the fiber network structures. The high porosity can be achieved without creating additional pores, and the pores are distributed evenly. The porosity may be up to 80% to 90%, undesired phenomena such as polarization caused by uneven distribution of pores may be effectively prevented, and lithium-ion migration is not hindered.

(2) The heat-resistant sub-layers are prepared through the first heat-resistant polymer material and/or the second heat-resistant polymer material (whose melting point is higher than 100° C.), so that the thermal contraction percentage of the prepared heat-resistant layer is small at a high temperature (>160° C.), and the structure is stable.

(3) The plurality of heat-resistant sub-layers whose pore-blocking temperatures are sequentially increased is formed in the heat-resistant layer, so that softening and pore blocking may occur in the heat-resistant sub-layers within different temperature ranges. Therefore, the composite membrane has a dynamic (periodic) pore blocking behavior. After pore blocking occurs at each heat-resistant sub-layer, the heat-resistant sub-layer may play a role of suppressing lithium-ion conduction (the ion conductivity is reduced at a high temperature), retarding reaction occurrence, and reducing reaction heat release, thereby adapting to internal overheating of the battery, to effectively prevent thermal failure of the membrane of the pore unblocking phenomenon. Thus, the battery is safer at a high temperature.

Other features and advantages of the present specification are described in detail in the following part of detailed description.

BRIEF DESCRIPTION OF THE DRAWINGS

The accompanying drawings are used to provide a further understanding of the present specification, and constitute a part of the specification, which are used to explain the present specification in combination with the following specific implementations and embodiments, and do not constitute a limitation to the present specification. In the accompanying drawings.

DETAILED DESCRIPTION

Figure 1:
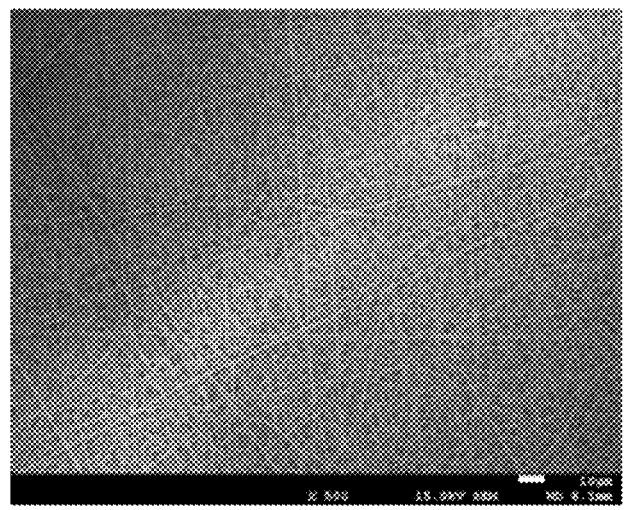
FIG. 1 shows a SEM picture of a polymer composite membrane F1 obtained according to Embodiment 1 of the present specification, where a magnification factor is 500.

Specific implementations and embodiments of the present specification are described in detail below. It should be understood that the specific implementations and embodiments described herein are merely used for illustrating the present specification rather than limiting the present specification.

Endpoints of all ranges and all values disclosed herein are not limited to the precise ranges or values, and these ranges or values should be understood as including values close to these ranges or values. For value ranges, endpoint values of the ranges, an endpoint value of each range and an independent point value, and individual point values may be combined with each other to obtain one or more new value ranges, and all these value ranges should be considered as being specifically disclosed herein.

Unless otherwise specified, nouns of locations such as "inner" and "outer" used in the present specification are in a relative location relationship that is a location relationship relative to a porous base material of a polymer composite membrane by using the porous base material as a center.

In the present specification, the term "pore-blocking temperature" indicates a temperature required for being capable of blocking micropores in a porous membrane, cutting off a current loop, and preventing a reaction of a battery from being out of control. A method for measuring the pore-blocking temperature includes: manufacturing a plurality of sample membranes whose thickness is 15 μm (being the same as corresponding heat-resistant sub-layers in a heat-resistant layer in a polymer composite membrane according to the present specification), separately heating the plurality of sample membranes at a group of temperatures apart by 10° C., measuring air permeability of the plurality of heated sample membranes, recording values of two neighboring temperatures at which an air permeability difference between sample membranes is greater than 200 (marked as a temperature range A), then heating a plurality of samples at another group of temperatures (whose temperature range is the foregoing recorded value range A) apart by 2° C., measuring air permeability of the plurality of heated sample membranes, and recording values of two neighboring temperatures at which an air permeability difference between sample membranes is greater than 200, wherein a higher temperature is determined as the pore-blocking temperature of the sample membrane. The air permeability of the sample membrane is tested by using a Gurley value: cutting the sample membrane into a sample having an area of 6.45 cm$^2$, and measuring, using a Gurley value tester GURLEY-4110 and at a pressure (height of water column) of 12.39 cm. A time (s/100 mL) is required by gas (air) of 100 mL to permeate the foregoing sample, where a smaller value thereof indicates better air permeability.

Just as introduced in the background technology, the existing technology has a technical problem that high-temperature stability of a composite membrane in a lithium-ion battery still needs to be improved. According to a first aspect of the present specification, a polymer composite membrane is provided, wherein the polymer composite membrane includes a porous base membrane and a heat-resistant layer covering at least one side surface of the porous base membrane. The heat-resistant layer includes a plurality of heat-resistant sub-layers sequentially stacked, and pore-blocking temperatures of the heat-resistant sub-layers are sequentially increased from inside to outside. Each of the heat-resistant sub-layers includes at least one of a first heat-resistant polymer material and a second heat-resistant polymer material, and each of the heat-resistant sub-layers is separately configured as a fiber network structure. The melting point of the first heat-resistant polymer material is not less than 200° C., and the melting point of the second heat-resistant polymer material is not less than 100° C.

The pore-blocking temperatures of the heat-resistant sub-layers in the heat-resistant layer may be selected within a wide range. However, both production costs of the heat-resistant layer and heat-resistant stability of the lithium-ion battery need to be considered. Preferably, the heat-resistant layer includes N heat-resistant sub-layers, and the pore-blocking temperature of a first heat-resistant sub-layer on an innermost side and in the heat-resistant layer is not less than 100° C., preferably 100° C. to 130° C. The pore-blocking temperature of an $N^{th}$ heat-resistant sub-layer is not less than 200° C., preferably not less than 250° C. When N≥3, and the pore-blocking temperature of an $(N-1)^{th}$ heat-resistant sub-layer in the heat-resistant layer is not less than 180° C., preferably 180° C. to 200° C.

In the above described heat-resistant layer, the pore-blocking temperature of the $N^{th}$ heat-resistant sub-layer is not less than 200° C., so that the $N^{th}$ heat-resistant sub-layer can block pores at another heat-resistant sub-layer (within a particular temperature range), block lithium-ion conduction between an anode and a cathode, and cut off charging/discharging between the anode and the cathode, but can still maintain good high-temperature stability. The $N^{th}$ heat-resistant sub-layer may exist as a backbone structure, and can still play a role of spacing the anode and the cathode apart at a high temperature, to prevent contact and short-circuit between the anode and the cathode caused by thermal contraction of the membrane. Moreover, the pore-blocking temperatures of the first heat-resistant sub-layer to the $(N-1)^{th}$ heat-resistant sub-layer are set to be progressively increased layer by layer. Therefore, the composite membrane has a dynamic (periodic) pore blocking behavior. After pore blocking occurs at each heat-resistant sub-layer, the heat-resistant sub-layer may play a role of suppressing lithium-ion conduction (the ion conductivity is reduced at a high temperature), retarding reaction occurrence, and reducing reaction heat release, thereby adapting to internal overheating of the battery and effectively prevent thermal failure of the membrane of a pore unblocking phenomenon. Thus, safety of the battery at a high temperature is improved.

In the foregoing heat-resistant sub-layer, the $N^{th}$ heat-resistant sub-layer may be formed through the second polymer material whose melting point is higher, and has a pore-blocking temperature close to the melting temperature of the second polymer material (for example, 200° C. to 700° C.). A high temperature environment of the battery during use is usually at 160° C. to 220° C. Therefore, the pore-blocking temperature of the $N^{th}$ heat-resistant sub-layer may not be monitored as long as the pore-blocking temperature is higher than 200° C., preferably higher than 250° C.

Based on the polymer composite membrane according to the present specification, the quantity of the heat-resistant sub-layers in the heat-resistant layer may be selected within a wide range. However, technical process complexity of the heat-resistant layer and heat-resistant stability of the lithium-ion battery need to be considered. Preferably, the heat-resistant layer comprises N heat-resistant sub-layers, wherein 3≤N≤10 or 4≤N≤6.

Based on the above described polymer composite membrane according to the present specification, the porosity of the heat-resistant layer is above 70%, or 70% to 95%, or 80% to 95%. The higher porosity of the heat-resistant layer may improve the ion conductivity of the polymer composite membrane. In the present specification, a manner of measuring the porosity of the heat-resistant layer is: fabricating a heat-resistant layer sample of a particular size, weighing, immersing the heat-resistant layer sample in n-butyl alcohol, measuring the weight of the sample after adsorption and balancing, and then calculating the porosity of the heat-resistant layer through a formula: 1−(mass after adsorption−mass before adsorption)/mass before adsorption ×100%.

Based on the above described polymer composite membrane according to the present specification, the surface density of the heat-resistant sub-layer is 0.1 g/m² to 5 g/m². The surface density of the heat-resistant sub-layer is the mass of a substance applied onto a base material membrane on a unit area. In the present specification, when the surface density of the heat-resistant sub-layer falls within the foregoing range, the conductivity may be effectively ensured without affecting migration of lithium ions, to improve the safety of the battery.

Based on the polymer composite membrane according to the present specification, the thickness of the heat-resistant sub-layer and the diameter of a fiber in the fiber network structure thereof are not specially limited. Preferably, the thickness of the heat-resistant sub-layer is 0.02 μm to 2 μm, and the diameter of the fiber is 100 nm to 2000 nm. The single-sided thickness of the heat-resistant layer in the polymer composite membrane is 0.5 μm to 30 μm, preferably 1 μm to 20 μm.

Based on the polymer composite membrane according to the present specification, in the heat-resistant sub-layers, based on the same first heat-resistant polymer material and the same second heat-resistant polymer material, by partially mixing the first heat-resistant polymer material and the second heat-resistant polymer material, the pore-blocking temperatures of the heat-resistant sub-layers can be adjusted. Preferably, in the polymer composite membrane according to the present specification, the heat-resistant sub-layers may be made of same first heat-resistant polymer materials and same second heat-resistant polymer materials. In the heat-resistant sub-layers, from inside to outside, contents of the first heat-resistant polymer materials are sequentially increased, and contents of the second heat-resistant polymer materials are sequentially reduced. Use of the same first heat-resistant polymer material and the same second heat-resistant polymer material not only reduces the burden to select the material, but also improves the flexibility of selecting the pore-blocking temperatures of the heat-resistant sub-layers.

Based on the polymer composite membrane according to the present specification, based on a total weight of each of the heat-resistant sub-layers, in each of the heat-resistant sub-layers, the content of the first heat-resistant polymer material is $(n-1)/(N-1)\times 100\%$, and the content of the second heat-resistant polymer material is $(N-n)/(N-1)\times 100\%$, wherein N is a total layer quantity of the heat-resistant sub-layers, and n is a serial number of one of the heat-resistant sub-layers in the direction from inside to outside. A specific calculating manner is shown in Table 1.

TABLE 1

| Layer number | First heat-resistant polymer material:second heat-resistant polymer material (weight) |
|---|---|
| n = 1 | 0:100 |
| n = 2 | 1:(N − 2) |
| n = 3 | 2:(N − 3) |
| ... | ... |
| n = N − 1 | (N − 2):1 |
| n = N | 100:0 |

Based on the polymer composite membrane according to the present specification, when the heat-resistant sub-layer includes both a first heat-resistant polymer material and a second heat-resistant polymer material, the first heat-resistant polymer material and the second heat-resistant polymer material may respectively exist as independent fibers, or may be blended in a same fiber. Preferably, the first heat-resistant polymer material and the second heat-resistant polymer material may be blended to improve evenness of the mixture.

Based on the polymer composite membrane according to the present specification, no special requirement is imposed on the first heat-resistant polymer material, such that a first heat-resistant polymer material regularly used in the art may be used. Preferably, the first heat-resistant polymer material may be selected from poly(p-phenylene terephthalamide) (PPTA), poly(m-phenylene isophthalamide) (PMIA), poly(p-benzamide) (PBA), poly(p-phenylene-2,6-benzobisoxazole) (PBO), poly(p-phenylene benzobisthiazole) (PBZT), poly(benzothiazole), poly(benzimidazole) (PBI), copoly(ether ketone), poly(benzoxazole), polyetherimide (PEI), poly(ether ether ketone) (PEEK), and polyimide (PI). The poly(ether ether ketone) may include copoly(ether ether ketone) (CoPEEK) and modified poly(ether ether ketone).

Further, the melting point of the poly(p-phenylene terephthalamide) is 500° C. to 550° C., the melting point of the poly(m-phenylene isophthalamide) is 450° C. to 500° C., the melting point of the poly(p-benzamide) is 350° C. to 420° C., the melting point of the poly(p-phenylene-2,6-benzobisoxazole) is 600° C. to 650° C., the melting point of the poly(p-phenylene benzobisthiazole) is 580° C. to 640° C., the melting point of the poly(benzothiazole) is 450° C. to 550° C., the melting point of the poly(benzimidazole) is 350° C. to 480° C., the melting point of the copoly(ether ketone) is 200° C. to 350° C., the melting point of the poly(benzoxazole) is 220° C. to 350° C., the melting point of the polyetherimide is 350° C. to 400° C., the melting point of the poly(ether ether ketone) is 320° C. to 350° C., and the melting point of the polyimide is 500° C. to 550° C.

The first heat-resistant polymer material absorbs less liquid in an electrolyte, so it can maintain a good polymeric form to improve the elastic modulus and the tensile strength of the polymer composite membrane at a normal temperature. Moreover, the melting point of these first heat-resistant polymer materials is higher (>200° C.), so it can keep a good shape at a high temperature as a backbone structure to support the porous base membrane, thereby improving the tensile strength of the polymer composite membrane at a high temperature. Preferably, the first heat-resistant polymer material is selected from one or more of poly(p-phenylene terephthalamide), poly(m-phenylene isophthalamide), poly(p-phenylene-2,6-benzobisoxazole), poly(p-benzamide), and polyimide.

Based on the polymer composite membrane according to the present specification, no special requirement is imposed on selecting the second heat-resistant polymer material. A raw material regularly used in the art may be selected, as long as the melting point of the second heat-resistant polymer material is not less than 100° C., and is less than the melting point of the first heat-resistant polymer material. Preferably, the second heat-resistant polymer material is selected from one or more of modified polyvinylidene fluoride (PVDF), polystyrene (PS), polyacrylate, polyethylene oxide (PEO), polyvinyl alcohol (PVA), polyacrylonitrile (PAN), a styrene-acrylonitrile copolymer (AS), polyvinylpyrrolidone (PVP), and a vinylpyrrolidone-styrene copolymer. Preferably, the modified polyvinylidene fluoride is polyvinylidene fluoride-hexafluoropropylene (PVDF-HFP) and/or polyvinylidene fluoride-acrylate (PVDF-AA). Preferably, the polyacrylate is one or more of polymethyl acrylate, polyethyl acrylate, and polymethyl methacrylate.

Based on the polymer composite membrane according to the present specification, the heat-resistant layer may be formed on one side surface of the porous base membrane, or may be formed on two side surfaces of the porous base membrane. Preferably, the heat-resistant layer is formed on each of the two side surfaces of the porous base membrane.

Based on the polymer composite membrane according to the present specification, the porous base membrane may be a polymer base membrane, or may be a ceramic membrane. A polyolefin membrane generally used for a lithium-ion battery may be used as the polymer base membrane, for example, includes but is not limited to a polypropylene (PP) membrane, a polyethylene (PE) membrane, and a PE/PP/PE three-layered membrane. The ceramic membrane, similar to a regular ceramic membrane in the art, includes both a polymer base membrane (which is the same as that described above) and a ceramic layer that is disposed on at least one side surface of the polymer base membrane.

Based on the polymer composite membrane according to the present specification, preferably, the porous base membrane is a ceramic membrane. No special requirement needs to be imposed on the ceramic layer in the ceramic membrane, and a regular ceramic layer in the art may be selected. For example, the ceramic layer may include ceramic particles and a binder, and a mass ratio of the ceramic particles to the binder is 9 to 24:1. When the content of each substance in the ceramic layer is within the preferred range, the obtained ceramic membrane have a better thermal-shrinkage resistance at a high temperature and air permeability.

Based on the polymer composite membrane according to the present specification, the type of the ceramic particles may be regular ceramic particles in the art. For example, it may be one or more of $Al_2O_3$, $SiO_2$, $BaSO_4$, $BaO$, $TiO_2$, $CuO$, $MgO$, $Mg(OH)_2$, $LiAlO_2$, $ZrO_2$, CNT, BN, SiC, $Si_3N_4$, WC, BC, AN, $Fe_2O_3$, $BaTiO_3$, $MoS_2$, $\alpha\text{-}V_2O_5$, $PbTiO_3$, $TiB_2$, $CaSiO_3$, molecular sieve, clay, boehmite, and kaolin. Moreover, an average particle size of the ceramic particle is 200 nm to 800 nm or 300 nm to 600 nm, thereby not only preventing coagulation of the slurry used for the ceramic layer, but also improving the air permeability of the ceramic membrane.

Based on the polymer composite membrane according to the present specification, the type of the binder in the ceramic layer is not particularly limited. The binder may be any substance that can be used to improve the strength of the ceramic membrane. For example, the binder may be at least one of polyacrylate (e.g., an average molecular weight $M_w$ is $1\times10^4$ g/mol to $1\times10^6$ g/mol), a copolymer of polyvinylidene fluoride and hexafluoropropylene (e.g., an average molecular weight $M_w$ is $1\times10^4$ g/mol to $1\times10^6$ g/mol), a copolymer of polyvinylidene fluoride and trichloro ethylene (e.g., an average molecular weight $M_w$ is $1\times10^4$ g/mol to $1\times10^6$ g/mol), polyacrylonitrile (e.g., an average molecular weight $M_w$ is $1\times10^4$ g/mol to $1\times10^6$ g/mol), polyvinyl pyrrolidone (e.g., an average molecular weight $M_w$ is $1\times10^5$ g/mol to $1\times10^6$ g/mol), polyimide (e.g., an average molecular weight $M_w$ is $1\times10^4$ g/mol to $1\times10^6$ g/mol), polyvinyl alcohol (e.g., an average molecular weight $M_w$ is $1\times10^3$ g/mol to $1\times10^5$ g/mol), and the like.

Based on the polymer composite membrane according to the present specification, the thickness of the polymer base membrane in the ceramic membrane is 5 μm to 30 μm or 6 μm to 25 μm. Moreover, the single-sheet thickness of the ceramic layer is preferably 1 μm to 5 μm or 2 μm to 3.5 μm, to improve thermal-shrinkage resistance of the ceramic membrane at a high temperature and the air permeability.

Based on the polymer composite membrane according to the present specification, the ceramic layer in the ceramic membrane may be formed on one side surface of the polymer base membrane, or on two side surfaces of the polymer base membrane. Preferably, the ceramic layer is formed on each of two side surfaces of the polymer base membrane.

Moreover, according to a second aspect of the present specification, a method for fabricating a polymer composite membrane is provided. The fabrication method includes the following steps: step S1, providing a polymer base membrane and step S2: forming precursors of a plurality of heat-resistant sub-layers sequentially superposed on at least one side surface of the polymer base membrane through an electrostatic spinning manner using a spinning solution, wherein the spinning solution contains a first heat-resistant polymer material and/or a second heat-resistant polymer material. The step S2 may also include drying and removing a solvent to obtain a heat-resistant layer including the plurality of heat-resistant sub-layers. The melting point of the first heat-resistant polymer material is not less than 200° C., the melting point of the second heat-resistant polymer material is not less than 100° C., and pore-blocking temperatures of the heat-resistant sub-layers are sequentially increased from inside to outside along the heat-resistant layer.

Based on the method according to the present specification, the heat-resistant sub-layers are directly formed on a surface of the polymer base membrane in the electrostatic spinning manner to form the heat-resistant layer. Not only the process is simpler and has high flexibility, but also the composite membrane prepared by this process has higher mechanical performance at a normal temperature and is more suitable for industrialized production.

Based on the method according to the present specification, the heat-resistant layer may include N heat-resistant sub-layers, and the pore-blocking temperature of a first heat-resistant sub-layer on an innermost side and in the heat-resistant layer is not less than 100° C., preferably 100° C. to 130° C. The pore-blocking temperature of an $N^{th}$ heat-resistant sub-layer is not less than 200° C., preferably not less than 250° C. When N≥3, and the pore-blocking temperature of an $(N-1)^{th}$ heat-resistant sub-layer in the heat-resistant layer is not less than 180° C., preferably 180° C. to 200° C.

Based on the method according to the present specification, the heat-resistant sub-layers are made of same first heat-resistant polymer materials and same second heat-resistant polymer materials. In the heat-resistant sub-layers, from inside to outside, contents of the first heat-resistant polymer materials are sequentially increased, and contents of the second heat-resistant polymer materials are sequentially reduced.

Based on the method according to the present specification, based on a total weight of each of the heat-resistant sub-layers, in each of the heat-resistant sub-layers, the content of the first heat-resistant polymer material is (n−1)/(N−1)×100%, and the content of the second heat-resistant polymer material is (N−n)/(N−1)×100%, wherein N is a total number of the heat-resistant sub-layers, and n is an index number of one of the heat-resistant sub-layers from inside to outside.

Based on the method according to the present specification, the first heat-resistant polymer material is one or more of poly(p-phenylene terephthalamide), poly(m-phenylene isophthalamide), poly(p-benzamide), poly(p-phenylene-2,6-benzobisoxazole), poly(p-phenylene benzobisthiazole), poly(benzothiazole), poly(benzimidazole), copoly(ether ketone), poly(benzoxazole), polyetherimide, poly(ether ether ketone), and polyimide.

The melting point of the poly(p-phenylene terephthalamide) is 450° C. to 500° C., the melting point of the poly(m-phenylene isophthalamide) is 500° C. to 550° C., the melting point of the poly(p-benzamide) is 350° C. to 420° C., the melting point of the poly(p-phenylene-2,6-benzobisoxazole) is 600° C. to 650° C., the melting point of the poly(p-phenylene benzobisthiazole) is 580° C. to 640° C., the melting point of the poly(benzothiazole) is 450° C. to 550° C., the melting point of the poly(benzimidazole) is 350° C. to 480° C., the melting point of the copoly(ether ketone) is 200° C. to 350° C., the melting point of the poly(benzoxazole) is 220° C. to 350° C., the melting point of the polyetherimide is 350° C. to 400° C., the melting point of the poly(ether ether ketone) is 320° C. to 350° C., and the melting point of the polyimide is 500° C. to 550° C.

Further, the first heat-resistant polymer material is selected from one or more of poly(p-phenylene terephthalamide), poly(m-phenylene isophthalamide), poly(p-phenylene-2,6-benzobisoxazole), poly(p-benzamide), and polyimide.

Based on the method according to the present specification, the second heat-resistant polymer material is selected from one or more of modified polyvinylidene fluoride, polystyrene, polyacrylate, polyethylene oxide, polyvinyl alcohol, polyacrylonitrile, a styrene-acrylonitrile copolymer, polyvinylpyrrolidone, and a vinylpyrrolidone-styrene copolymer. The modified polyvinylidene fluoride is polyvinylidene fluoride-hexafluoropropylene and/or polyvinylidene fluoride-acrylate. The polyacrylate is one or more of polymethyl acrylate, polyethyl acrylate, and polymethyl methacrylate.

Based on the method according to the present specification, when the heat-resistant sub-layer includes both a first heat-resistant polymer material and a second heat-resistant polymer material, a method for forming a precursor of the heat-resistant sub-layer includes: dissolving both the first heat-resistant polymer material and the second heat-resistant polymer material in the solvent to form a mixed spinning solution; and performing electrostatic spinning on the mixed spinning solution to form the corresponding precursor of the heat-resistant sub-layer. Both the first heat-resistant polymer material and the second heat-resistant polymer material are mixed in the same spinning solution to improve the dispersion evenness of the prepared heat-resistant sub-layers.

Based on the method according to the present specification, when the heat-resistant sub-layer includes both a first heat-resistant polymer material and a second heat-resistant polymer material, a method for forming a precursor of the heat-resistant sub-layer further includes: separately fabricating a spinning solution A containing the first heat-resistant polymer material and a spinning solution B containing the second heat-resistant polymer material, and performing electrostatic spinning using both the spinning solution A and the spinning solution B to form the corresponding precursor of the heat-resistant sub-layer. Spinning solutions are respectively prepared through the first heat-resistant polymer material and the second heat-resistant polymer material to reduce the requirement for the solvent and the production difficulty.

Based on the method according to the present specification, a spinning polymer including the first heat-resistant polymer material and/or the second heat-resistant polymer material is dissolved in an organic solvent to form the spinning solution, wherein the concentration range of the spinning polymer is the concentration range in which spinning may be performed using the electrostatic spinning method. In the present specification, in step S2, the concentration of the spinning polymer in the spinning solution, including the first heat-resistant polymer material and/or the second heat-resistant polymer material, is 3 wt % to 30 wt % or 8 wt % to 20 wt %. When the relative molecular mass of the spinning polymer is fixed, if other conditions are determined, tangle of a molecular chain in the solution is determined at least by the concentration of the spinning solution. Polymer solutions may be divided into a polymer dilute solution, a semi-dilute solution, and a concentrated solution according to different concentrations and molecular chain morphologies. In the dilute solution, molecular chains are separated from each other and distributed evenly. As the concentration of the solution is increased, molecular chains, which are interweaved and overlapped with each other, are tangled. A boundary concentration between the dilute solution and the semi-dilute solution is referred to as a contact concentration, at which the molecular chains are in contact and subsequently overlapped with each other as the concentration of the solution is increased. A boundary concentration between the semi-dilute solution and the concentrated solution is referred to as a tangle concentration, at which the molecular chains are interweaved and tangled with each other as the concentration of the solution is further increased. In the present specification, the concentration of the spinning solution within the foregoing range may effectively result in filamentation. Moreover, as the concentration of the spinning solution is increased, the tangle of the polymer is increased, and the filamentation is better. In the present specification, when spinning solutions of different heat-resistant sub-layers are prepared for electrostatic spinning, the concentration of each spinning solution is independently selected from the foregoing concentration range.

Based on the method according to the present specification, the organic solvent that may be used in the spinning solution includes but is not limited to one or more solvents of N,N-dimethylacetamide, N-methypyrrolidone, N,N-dimethylformamide, toluene, hexamethylphosphoramide, acetone, and the like.

Based on the fabrication method according to the present specification, in step S2 of fabricating the spinning solution, when the spinning solution includes the first heat-resistant polymer material, the step S2 further includes: adding a dissolution promoter of the first heat-resistant polymer material to the organic solvent, wherein the dissolution promoter is one or more of an inorganic saline dissolution promoter, an inorganic alkaline dissolution promoter, and an organic saline dissolution promoter. Moreover, after forming the heat-resistant layer, the method further may include immersing the heat-resistant layer in water to elute the dissolution promoter. In the fabrication method, addition of the dissolution promoter facilitates dissolution of the heat-resistant polymer and formation of a spinning form. A particular quantity of lithium ions can be also introduced in the heat-resistant layer through addition of some dissolution promoters to supply lithium ions in the battery and to improve performance of the battery.

Based on the fabrication method according to the present specification, based on a total weight of the first heat-resistant polymer material, the usage amount of the dissolution promoter is 0.1 wt % to 5 wt %, or 0.1 wt % to 3 wt %, or 0.1 wt % to 2 wt %. The inorganic saline dissolution promoter is one or more of lithium chloride, calcium chloride, lithium hexafluorophosphate, sodium chloride, and potassium chloride. The inorganic alkaline dissolution promoter is one or more of lithium hydroxide, potassium hydroxide, and sodium hydroxide. The organic saline dissolution promoter is one or more of lithium bis(trifluoromethanesulfonyl)imide and bis(trifluoromethanesulfonyl)imidazole. In the fabrication method, when the used dissolution promoter contains chloride ions or hydroxide ions, immersing and eluting the heat-resistant layer usually needs to be performed.

Based on the fabrication method according to the present specification, the basic principle of the electrostatic spinning method is well known by a person skilled in the art, and is specified as, applying a voltage between an ejection device and a receiving device, forming a jet stream of a spinning solution originating from a pyramidal end portion of the ejection device, stretching the jet stream in an electric field, and forming fibers on the receiving device. The receiving device includes a roller (rotatable) or a receiving plate. The electrostatic spinning method usually includes a needle spinning method or a needleless spinning method, and each specific process is well known by a person skilled in the art. Details are not described herein.

When the electrostatic spinning method is the needle spinning method, the stream velocity of the spinning solution is 0.3 mL/h to 5 mL/h or 0.6 mL/h to 2 mL/h. The spinning temperature is 25° C. to 70° C. or 30° C. to 50° C. The spinning humidity is 2% to 60% or 2% to 50%. The spinning voltage is preferably 5 kV to 25 kV or 8 kV to 20 kV. When the stream velocity falls within the above range, an appropriate fiber diameter can be guaranteed, and the needle may be effectively prevented from being jammed for smooth spinning. When the mixed solvent provided in the present specification is used, if the stream velocity falls within the foregoing range, a heat-resistant layer having excellent porosity and bonding performance may be obtained. When the spinning temperature and the spinning humidity fall within the foregoing range, in cooperation with the foregoing mixed solvent, the fibers obtained through spinning is smoothly filamented and then dried to prevent decrease of the porosity caused by adhesion of the fibers and decrease of bonding performance of the heat-resistant layer. When the voltage falls within the foregoing range, the spinning solution may be effectively triggered to form the jet stream, thereby generating an effective stretching in the electric field, obtaining an appropriate fiber diameter, ensuring the fiber morphology, and improving the porosity and the bonding performance of the heat-resistant layer. Moreover, the receiving device may be a roller, and the rotational speed of the roller may be 100 rpm to 6000 rpm or 1000 rpm to 2000 rpm. When the linear velocity of a surface of a collection device used to collect fiber is excessively small, since rapid movement of the jet stream is disordered, fibers formed on the surface of the collection device are accumulated and distributed irregularly, and the mechanical strength of the obtained heat-resistant layer is weak. When the linear velocity of the surface of the collection device reaches a particular level, the fibers is tightly attached onto the surface of the collection device in a circular manner, and deposited in a same direction at a straight state, to form fiber bundles that are straight and extend in a same direction. On the other hand, when the linear velocity of the surface of the collection device is excessively large, since an excessively rapid receiving speed damages the jet stream of the fiber, continuous fibers cannot be obtained. Through experiments, the inventor finds that, when the rotational speed of the collection device is 100 rpm to 6000 rpm, fiber bundles that are straight and extend in a same direction may be obtained. When the rotational speed of the collection device is 1000 rpm to 2000 rpm, the morphology of the fiber in the heat-resistant layer is better to further improve the mechanical strength of the heat-resistant layer.

When the electrostatic spinning method is the needleless spinning method, spinning conditions may include, the temperature is 25° C. to 70° C., the humidity is 2% to 60%, the speed of a liquid pool is 0 mm/sec to 2000 mm/sec, the speed of a base material is 0 mm/min to 20000 mm/min (when the collection device is plate-shaped, and does not rotate) or the rotational speed of a roller is 100 rpm to 6000 rpm (when the collection device is the roller), the voltage of an anode (the voltage of a source end for generating fiber) is 0 kV to 150 kV, the voltage of a cathode (the voltage of the collection device) is −50 kV to 0 kV, and a voltage difference (a difference between the voltage of the source end and that of the collection device) is 10 kV to 100 kV. The conditions may further include, the temperature is 30° C. to 50° C., the humidity is 2% to 50%, the speed of a liquid pool is 100 mm/sec to 400 mm/sec, the speed of a base material is 1000 mm/min to 15000 mm/min or the rotational speed of a roller is 1000 rpm to 2000 rpm, the voltage of an anode is 10 kV to 40 kV, the voltage of a cathode is −30 kV to 0 kV, and a voltage difference is 20 kV to 60 kV.

The inventor of the present specification found that, when the concentration of the spinning polymer in the spinning solution falls within the foregoing ranges, by using the electrostatic spinning process under the foregoing conditions, the volatilization speed of the solvent may well match the fiber forming speed to obtain a heat-resistant layer having a food appearance, higher adhesiveness, and better bonding between filaments in the heat-resistant layer. The porosity of the heat-resistant fiber layer may be above 70%, or 70% to 95%, or 80% to 95%.

Based on the fabrication method according to the present specification, the surface density of the heat-resistant sub-layer is not limited, and may be adjusted by controlling a specific process condition. The surface density of the heat-resistant sub-layer is 0.1 g/m² to 5 g/m². The surface density of the heat-resistant layer is the mass of a substance applied onto a base material membrane on a unit area. In the present specification, when the surface density of the heat-resistant layer falls within the foregoing range, the conductivity may be effectively ensured without affecting migration of lithium ions, to improve the safety of the battery.

Based on the fabrication method according to the present specification, the thickness of the heat-resistant sub-layer and the diameter of a fiber bundle in the heat-resistant sub-layer are not limited, and may be adjusted by controlling a specific process condition. The thickness of the heat-resistant sub-layer and the diameter of a fiber in the fiber network structure thereof are not limited. The thickness of the heat-resistant sub-layer is 0.02 μm to 2 μm, and the diameter of the fiber is 100 nm to 2000 nm. The single-sided thickness of the heat-resistant layer in the polymer composite membrane is 0.5 μm to 30 μm or 1 μm to 20 μm. According to the method for fabricating a polymer composite membrane provided in the present specification, the heat-resistant layer formed through the electrostatic spinning may be compounded on one side surface of the porous base membrane, or compounded on two side surfaces of the porous base membrane. In step S2, through electrostatic spinning, the heat-resistant layer may be formed on each of two side surfaces of the porous base membrane.

Based on the fabrication method according to the present specification, after a precursor of the heat-resistant layer is formed, no special requirement is needed for drying the precursor of the heat-resistant layer. Conditions of the drying may include a drying temperature is 40° C. to 60° C., and a drying time is 5 min to 30 min.

Based on the fabrication method according to the present specification, after step S2 of forming the heat-resistant layer on the porous base membrane through electrostatic spinning, the method further includes selectively performing membrane lamination processing at 50° C. to 120° C. and under 0.5 Mpa to 15 Mpa. For example, thermal rolling is performed at a temperature of 50° C. to 60° C. and a pressure of 1 MPa to 15 MPa, and then air blowing and drying are performed for 24h at 50° C. After the heat-resistant layer is formed through electrostatic spinning, pressing processing is performed on the composite membrane at a particular temperature and a particular pressure. Therefore, the final thickness of the composite membrane is reduced, and a spinning layer and the membrane or the ceramic membrane are more compact and firmer between each other.

Based on the fabrication method according to the present specification, in step S1, the porous base membrane is a ceramic membrane, and the ceramic membrane includes a polymer base membrane and a ceramic layer on at least one side surface of the polymer base membrane. In step S2, the heat-resistant layer is formed on a surface of the ceramic layer of the ceramic membrane. According to the present specification, using the ceramic membrane, the heat-resistant layer may be firmly bonded onto a surface of the ceramic layer by the characteristic that the ceramic layer of the ceramic membrane contains an inorganic particle layer. The peeling strength of the polymer composite membrane may be improved. Since the inorganic particle layer is located between the polymer membrane and the heat-resistant layer, and the entire polymer composite membrane may have excellent thermal shrinkage resistance performance.

Based on the fabrication method according to the present specification, a method for fabricating the ceramic membrane in step S1 includes: S11, providing a polymer base membrane; and S12, mixing and stirring ceramic particles and a binder according to a weight ratio of 9 to 24: 1 to obtain a ceramic layer slurry, applying the ceramic layer slurry onto at least one side surface of the polymer base membrane, and performing drying to obtain the ceramic layer, e.g., the ceramic layer is formed on each of two side surfaces of the polymer base membrane.

Based on the fabrication method according to the present specification, the dispersity of raw materials in the ceramic layer slurry and the stability of the ceramic layer slurry are comprehensively considered. In step S12, the ceramic particles and the binder are blended at 3000 rpm to 10000 rpm, or at 3000 rpm to 9000 rpm, or at 3000 rpm to 8000 rpm. The substances for forming the ceramic layer slurry are mixed at the foregoing rotational speed to improve the surface density of the ceramic membrane.

Based on the fabrication method according to the present specification, the thickness of the polymer base membrane may be 5 μm to 30 μm or 6 μm to 25 μm. The material of the polymer base membrane is described above, and details are not described herein. Moreover, the usage amount of the ceramic layer slurry enables the single-sided thickness of the obtained ceramic layer to be 1 μm to 5 μm or 2 μm to 3.5 μm, to improve the thermal-shrinkage resistance performance of the ceramic membrane at high temperature and the air permeability. Types and properties of the ceramic particles and the binder in the ceramic layer slurry and the material of the polymer base membrane are described above, and details are not described herein.

Based on the fabrication method according to the present specification, step S12 includes, stirring the ceramic particles and the binder for 0.5 hours to 2 hours at a rotational speed of 3000 rpm to 4000 rpm, applying the obtained slurry onto at least one side surface of the polymer base membrane, and drying to form the ceramic layer on the at least one side surface of the polymer base membrane, where the ceramic particles and the binder are fed according to a weight ratio of 9 to 24:1. The temperature of the drying is 50° C. to 80° C. In step S12, the ceramic layer is formed on each of two surfaces of the polymer base membrane.

In the present specification, the solvent used to prepare the ceramic layer slurry is one or more of N-methypyrrolidone (NMP), N,N-dimethylformamide (DMF), N,N-dimethylacetamide (DMAc), toluene, dichloromethane, chloroform, deionized water, and ethanol. In the foregoing slurry, a weight ratio of the inorganic particles to the coating solvent to the binder is 9 to 24:67 to 500:1.

Moreover, the present specification further provides a lithium-ion battery, where the lithium-ion battery includes an anode, a cathode, and a battery membrane located between the anode and the cathode, wherein the battery membrane is the polymer composite membrane according to the present specification.

The electrolyte is well known by a person skilled in the art, and is usually formed by an electrolyte lithium salt and an organic solvent. A dissociable lithium salt is used as the electrolyte lithium salt. For example, the electrolyte lithium salt may be selected from at least one of lithium hexafluorophosphate ($LiPF_6$), lithium perchlorate ($LiClO_4$), lithium tetrafluoroborate (LiBF4), and the like, and the organic solvent may be selected from at least one of ethylene carbonate (EC), propylene carbonate (PC), dimethyl carbonate (DMC), ethyl methyl carbonate (EMC), diethyl carbonate (DEC), vinylene carbonate (VC), and the like. The concentration of the electrolyte lithium salt in the electrolyte is 0.8 mol/L to 1.5 mol/L.

The anode is made by mixing an anode material used for the lithium-ion battery, a conductive agent, and a binder into a slurry, and applying the slurry onto an aluminum foil. The anode material includes any anode material that may be used for the lithium-ion battery, for example, at least one of lithium cobalt oxide ($LiCoO_2$), lithium nickel oxide ($LiNiO_2$), lithium manganese oxide ($LiMn_2O_4$), lithium iron phosphate ($LiFePO_4$), and the like.

The cathode is made by mixing a cathode material used for the lithium-ion battery, a conductive agent, and a binder into a slurry, and applying the slurry onto a copper foil. The cathode material includes any cathode material that may be used for the lithium-ion battery, for example, at least one of graphite, soft carbon, hard carbon, and the like.

A main improvement of the lithium-ion battery provided in the present specification is that a novel polymer composite membrane is used as the battery membrane. The arrangement manner (connection manner) of the anode, the cathode, the polymer composite membrane, and the electrolyte may be the same as that in the prior art. This can be known by a person skilled in the art, and details are not described herein.

The lithium-ion battery provided in the present specification has advantages of good cycle performance, long service life, good rate charge/discharge performance, and good high-temperature performance.

A method for fabricating a lithium-ion battery provided in the present specification includes, stacking or winding an anode, a battery membrane, and a cathode sequentially into an electrode core, injecting an electrolyte into the electrode core, and sealing, wherein the battery membrane is the foregoing polymer composite membrane. The materials or formations of the anode, the cathode, and the electrolyte are described above, and details are not described herein.

The present specification is described in detail below by using some embodiments.

A method for testing performance parameters related to the following embodiments and comparison examples is as follows.

(1) Test of the porosity of the heat-resistant layer includes, tailoring a heat-resistant layer sample of 6 cm×6 cm, weighing, immersing the heat-resistant layer sample in n-butyl alcohol, and measuring the weight of the sample after adsorption and balancing, wherein the porosity=1−(mass after adsorption−mass before adsorption)/mass before adsorption×100%.

(2) Method for measuring the pore-blocking temperature includes manufacturing a plurality of sample membranes whose thickness is 15 μm (which is the same as heat-resistant sub-layers in the following embodiment), separately heating the plurality of sample membranes at a group of temperatures apart by 10° C., measuring air permeability of the plurality of heated sample membranes, recording values of two neighboring temperatures at which an air permeability difference there between is greater than 200 (marked as a temperature range A), heating a plurality of samples at another group of temperatures (whose temperature range is the foregoing recorded temperature range A) apart by 2° C., measuring air permeability of the plurality of heated sample membranes, and recording values of two neighboring temperatures at which an air permeability difference there between is greater than 200, wherein a higher temperature is the pore-blocking temperature of the sample membrane.

The air permeability of the sample membrane tested by using a Gurley value includes cutting the sample membrane into a sample having an area of 6.45 $cm^2$, measuring by using a Gurley value tester GURLEY-4110, a pressure (height of water column) of 12.39 cm, and the time (s/100 mL) required to permeate the foregoing sample by gas (air) of 100 mL, wherein a smaller value thereof indicates better air permeability.

(3) Test of the mechanical strength includes, using a universal testing machine (calibrated) of Shenzhen Junrui, testing the stretching and puncturing performance of a polymer composite membrane prepared in each of the following embodiments.

(4) Test of the thermal shrinkage percentage includes tailoring a square sheet of 6 cm×6 cm from the polymer composite membrane prepared in the foregoing embodiments, placing the square sheet into an oven, respectively baking the square sheet for 1 h at 120° C., 140° C., 160° C., and 180° C., and measuring the length and the width of the baked square sheet. A formula of calculating the thermal shrinkage percentage is, thermal shrinkage percentage=(1−the length of the sample after thermal shrinkage/6)×100%.

(5) Test of the ion conductivity includes, using an alternating-current impedance test, tailoring the polymer composite membrane prepared in each of the embodiments and the comparison examples into a wafer whose diameter is 17 mm, and testing the wafer. For the testing method, refer to the foregoing test of the ion conductivity of the bonding layer.

Embodiment 1 (Fabricating a Two-Layered Polymer Composite Membrane of PE Base Membrane-Heat-Resistant Layer)

This embodiment is used to describe a polymer composite membrane and a method for fabricating same provided in the present specification.

(1) Form a heat-resistant layer (including six heat-resistant sub-layers of different materials)

A spinning polymer (for a specific raw material, refer to Table 2) and an dissolution promoter are added to N,N-dimethylacetamide (DMAc) (which is commercially available from Aladdin Reagent Co., Ltd., the same below), and N,N-dimethylacetamide (DMAc) is magnetically stirred in water bath at 70° C. to fully dissolve the spinning polymer and the dissolution promoter, to form spinning solutions A to F whose polymer (the foregoing AS) concentration is 15 wt %.

TABLE 2

| | Spinning polymer | Dissolution promoter (wt %) |
|---|---|---|
| Spinning solution A | AS | No |
| Spinning solution B | Mixture of AS and PMIA of a weight ratio 4:1 | Lithium chloride (0.4 wt % of PMIA) |
| Spinning solution C | Mixture of AS and PMIA of a weight ratio 3:2 | Lithium chloride (0.4 wt % of PMIA) |
| Spinning solution D | Mixture of AS and PMIA of a weight ratio 2:3 | Lithium chloride (0.4 wt % of PMIA) |
| Spinning solution E | Mixture of AS and PMIA of a weight ratio 1:4 | Lithium chloride (0.4 wt % of PMIA) |
| Spinning solution F | PMIA | Lithium chloride (0.4 wt % of PMIA) |

AS is a styrene-acrylonitrile copolymer. It is commercially available from Aladdin Co., Ltd., and has a melting point of 120° C. to 125° C. The same below.
PMIA is poly(m-phenylene isophthalamide). It is commercially available from Yantai Tayho Advanced Materials Co., Ltd., and has a melting point of 450° C. to 500° C. The same below.

One side surface of a PE base membrane of 11 μm (which is commercially available from Japan SK Corporation and whose trade mark is BD1201, the same below) wraps a roller (a collection device). On another side surface of the PE base membrane, electrostatic spinning is performed sequentially on the spinning solutions A to F by using a needle electrostatic spinning method. Electrostatic spinning parameters are adjusted as follows, the receiving distance is 12 cm, the temperature is 25° C., the humidity is 20%, the inner diameter of a needle is 0.46 mm, a speed of the needle is 6.6 mm/sec, the voltage is 10 kV, the stream velocity is 0.3 mL/h, and the rotational speed of the roller is 2000 rpm.

After electrostatic spinning, the PE base membrane is taken down, mold pressing is performed for 5 min at a pressure of 10 MPa, and air blowing and drying are performed for 24 h at 50° C. to obtain a polymer composite membrane on which a heat-resistant layer (whose thickness is 6 μm and porosity is 82%) having a fiber network structure is formed. The polymer composite membrane is immersed in water for 5 min, then taken out and baked in an oven (80° C.) for 1 h, to obtain a polymer composite membrane F1.

Six heat-resistant sub-layers are sequentially formed in the polymer composite membrane F1 outwards from a surface of the PE base membrane, and are a heat-resistant sub-layer A (having a thickness of 1 μm and a pore-blocking temperature of 123° C.), a heat-resistant sub-layer B (having a thickness of 1 μm and a pore-blocking temperature of 132° C.), a heat-resistant sub-layer C (having a thickness of 1 μm and a pore-blocking temperature of 140° C.), a heat-resistant sub-layer D (having a thickness of 1 μm and a pore-blocking temperature of 175° C.), a heat-resistant sub-layer E (having a thickness of 1 μm and a pore-blocking temperature of 196° C.), and a heat-resistant sub-layer F (having a thickness of 1 μm and a pore-blocking temperature greater than 250° C.), respectively.

(3) Structure and performance representation of the polymer composite membrane.

Figure 2:
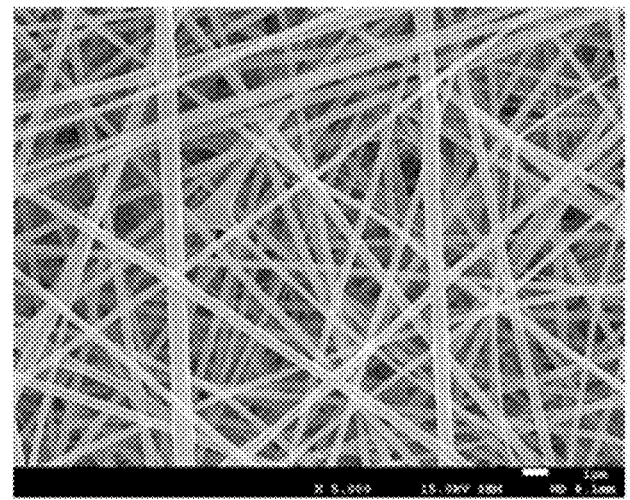
FIG. 2 shows a SEM picture of a polymer composite membrane F1 obtained according to Embodiment 1 of the present specification, where a magnification factor is 5000.

FIG. 1 and FIG. 2 are SEM pictures of the polymer composite membrane F1 at different magnification factors. It may be seen from FIG. 1 and FIG. 2 that, the heat-resistant layer is formed by many fibers having similar thicknesses, the formed heat-resistant layer contains a large quantity of pores distributed evenly, and the ceramic layer under the heat-resistant layer can be seen. Moreover, it may be seen that a network structure is formed between the fibers.

Figure 3:
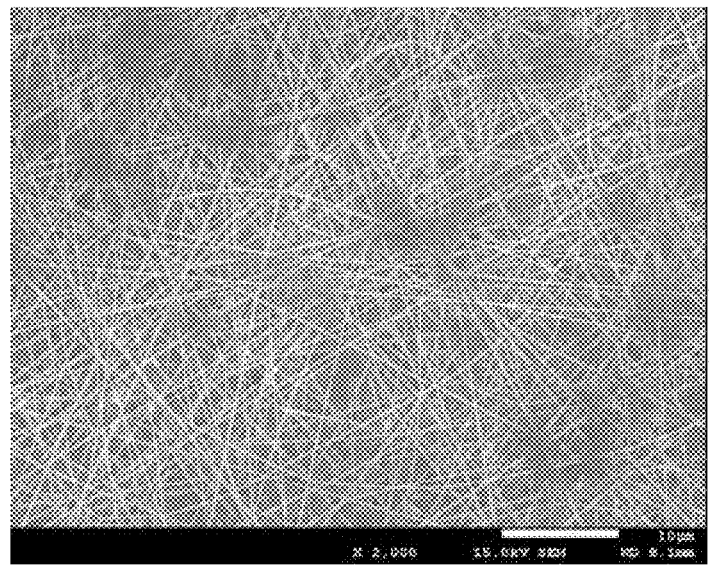
FIG. 3 shows a SEM picture of a polymer composite membrane F1 obtained according to Embodiment 1 of the present specification after being baked at 170° C., where a magnification factor is 10000.

FIG. 3 is a SEM picture of the polymer composite membrane F1 after being baked for 1 h at 170° C. It may be seen from the picture that the fiber can still keep an original fiber form after 170° C., and a melting to form a membrane phenomenon does not occur. The keeping of the original form of the fiber may improve the strength of the membrane greatly at a high temperature, and further plays a role of enhancing the strength of the composite membrane at a high temperature, so that the membrane formed by the remaining polymer can block pores and block lithium-ion migration with support from the fiber, thereby disconnecting the battery, to ensure safety of the battery at a high temperature and prevent thermal failure of the battery.

The diameter of the fibers in the SEM image is measured by TEM Macrography software. The data is recorded, and an average fiber diameter is calculated as 186 nm. According to the gravimetric method, the surface density of the heat-resistant layer is calculated as 1.25 g/m². Moreover, through testing, the transverse stretching strength and the longitudinal stretching strength of the polymer composite membrane F1 are respectively 121 Mpa and 125 MPa, the needling strength is 0.534 kgf, and the ion conductivity is 6.8 mS/cm. Moreover, the polymer composite membrane F1 is baked for 1 h at 120° C., 140° C., 160° C., and 180° C., transverse thermal shrinkage percentages are respectively 0.00%, 0.00%, 3.50%, and 7.00%, longitudinal thermal shrinkage percentages are respectively 0.00%, 0.00%, 4.00% and, 7.50%, and ion conductivities are respectively 6.8 mS/cm, 5.8 mS/cm, 3.5 mS/cm, and 2.3 mS/cm.

Embodiment 2 (Fabricating A Three-layered Polymer Composite Membrane of Heat-Resistant Layer-PE Base Membrane-Heat-Resistant Layer)

This embodiment is used to describe a polymer composite membrane and a method for fabricating same provided in the present specification.

(1) Forming a heat-resistant layer includes, first forming a first heat-resistant layer (having a thickness of 3 μm and a porosity of 85%) on a side of a PE base membrane by using the method in Embodiment 1, wherein the first heat-resistant layer includes six heat-resistant sub-layers that are sequentially formed outwards from a surface of the PE base membrane and are respectively a heat-resistant sub-layer A (having a thickness of 0.5 μm and a pore-blocking temperature of 123° C.), a heat-resistant sub-layer B (having a thickness of 0.5 μm and a pore-blocking temperature of 132° C.), a heat-resistant sub-layer C (having a thickness of 0.5 μm and a pore-blocking temperature of 140° C.), a heat-resistant sub-layer D (having a thickness of 0.5 μm and a pore-blocking temperature of 176° C.), a heat-resistant sub-layer E (having a thickness of 0.5 μm and a pore-blocking temperature of 196° C.), and a heat-resistant sub-layer F (having a thickness of 0.5 μm and a pore-blocking temperature greater than 250° C.), forming a second heat-resistant layer (having a thickness of 3 μm and a porosity of 83%) on another side of the PE base membrane, wherein the second heat-resistant layer and the first heat-resistant layer are of the same structure and material, immersing, and drying processing to obtain the polymer composite membrane F2.

Through testing, the transverse stretching strength and the longitudinal stretching strength of the polymer composite membrane F2 are respectively 122 Mpa and 124 MPa, the needling strength is 0.53 kgf, and the ion conductivity is 6.9 mS/cm. Moreover, the polymer composite membrane F2 is baked for 1 h at 120° C., 140° C., 160° C., and 180° C., transverse thermal shrinkage percentages are respectively 0.0%, 0.0%, 3.4% and 6.8%, longitudinal thermal shrinkage percentages are respectively 0.0%, 0.0%, 4.1% and, 7.0%, and ion conductivities are respectively 6.8 mS/cm, 6.0 mS/cm, 5.6 mS/cm, and 3.0 mS/cm.

COMPARISON EXAMPLE 1

This comparison example is an independent comparison example of a PE base membrane, and is used to comparatively describe a polymer composite membrane and a method for fabricating same provided in the present specification.

(1) A PE membrane that is commercially available from Japan SK Corporation and whose trade mark is BD1201 is used as a comparison sample, and is marked as DF1 (whose thickness is 12 μm and porosity is 45%).

(2) Characteristic of the polymer composite membrane.

Figure 4:
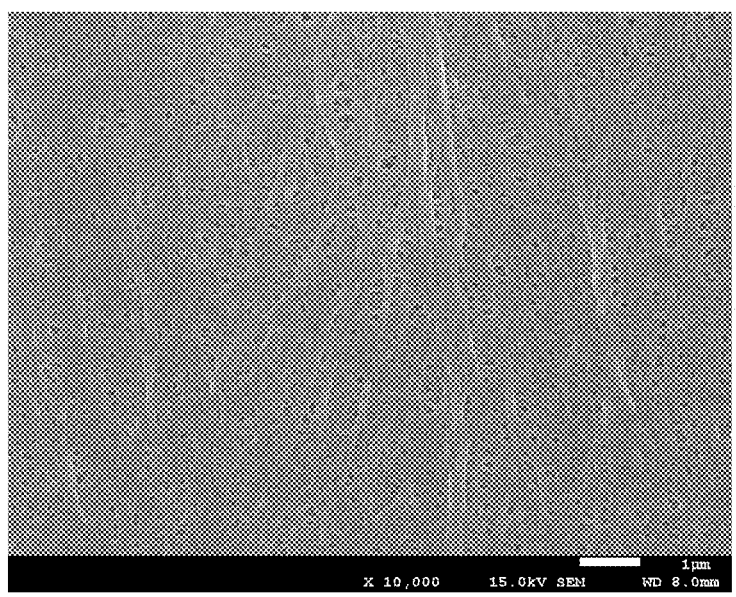
FIG. 4 shows a SEM picture of a porous PE base membrane DF1 according to a comparison example 1 of the present specification, where a magnification factor is 2000.
Figure 5:
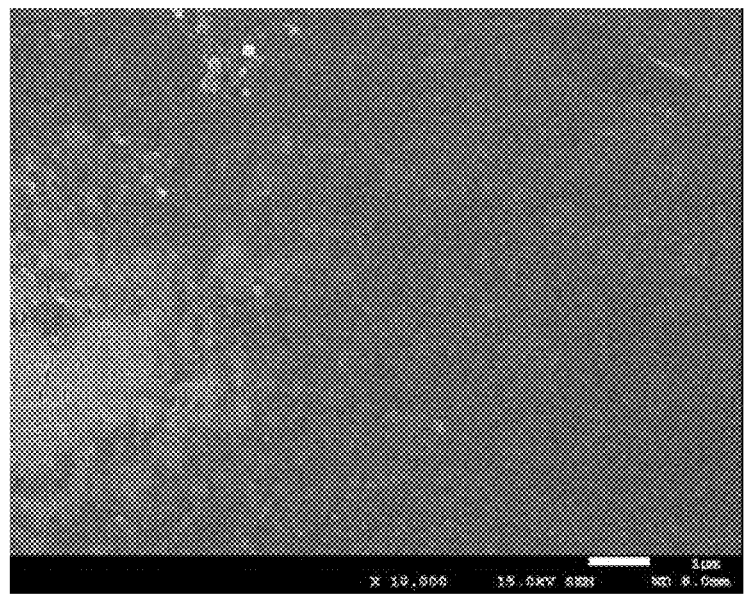
FIG. 5 shows a SEM picture of a porous PE base membrane DF1 according to a comparison example 1 of the present specification after being baked at 170° C., where a magnification factor is 10000.

FIG. 4 is a SEM picture of a PE membrane DF1 at a normal temperature, and FIG. 5 is a SEM picture of a PE membrane DF1 after being baked for 1 h at 150° C. It can be seen from the pictures that the PE porous membrane contains a large quantity of pores without being baked, but after the porous membrane is baked for 1 h at 150° C., the large quantity of pores cannot be seen on the membrane, and a layer of dense polymer membrane is formed. This is because the porous base membrane is made of PE whose melting point is lower at approximately 120° C. to 130° C., so that the PE membrane has been melted at 150° C. However, if the temperature continues to increase, this layer of polymer membrane is further fractured and contracted. As a result, the battery is short-circuited, to cause thermal failure.

Through testing, the transverse stretching strength and the longitudinal stretching strength of the PE membrane are respectively 150 Mpa and 152 MPa, the needling strength is 0.501 kgf, and the ion conductivity is 7.9 mS/cm. Moreover, the PE membrane is baked for 1 h at 120° C., 140° C., 160° C., and 180° C., transverse thermal shrinkage percentages are respectively 70%, 95%, 95%, and 95% (basically melted into a ball in case of 95%), and longitudinal thermal shrinkage percentages are respectively 75.2%, 96%, 96%, and 96% (basically melted into a ball in case of 95%).

COMPARISON EXAMPLE 2

Fabricating a Two-Layered Polymer Composite Membrane of PE Base Membrane-Heat-Resistant Layer The comparison example is used to comparatively describe beneficial effects of a polymer composite membrane provided in the present specification.

(1) Preparing spinning solutions includes Poly(m-phenylene isophthalamide) (PMIA) and lithium chloride of 4% of the total weight of PMIA are added to N,N-dimethylacetamide (DMAc) (which is commercially available from Aladdin Reagent Co., Ltd., the same below), and N,N-dimethylacetamide (DMAc) is magnetically stirred in water bath at 70° C. to fully dissolve the PMIA and the lithium chloride, to form spinning solutions whose polymer (the foregoing AS) concentration is 15 wt %.

(2) Forming a heat-resistant layer (single material layer) on a PE base membrane.

One side surface of a PE base membrane of 11 μm wraps a roller. On another side surface of the PE base membrane, electrostatic spinning is performed sequentially on the spinning solutions using a needle electrostatic spinning method. For electrostatic spinning parameters, refer to Embodiment 1. A polymer composite membrane DF2 is obtained.

(3) Characteristics of the polymer composite membrane.

Figure 6:
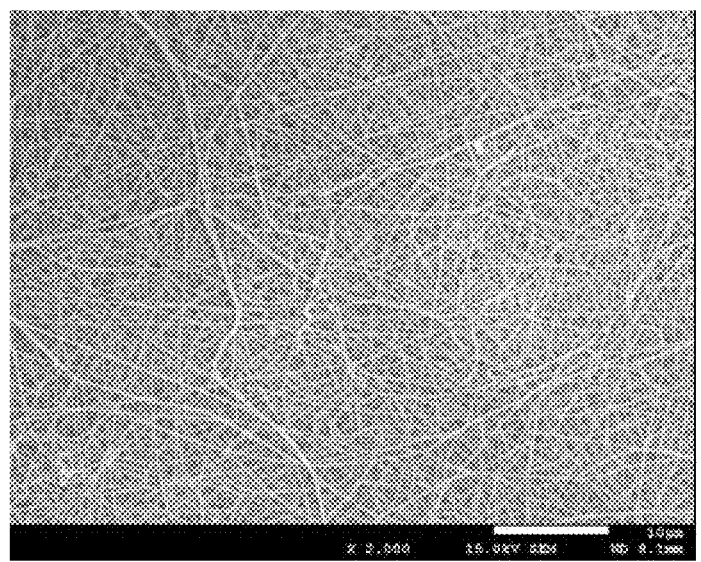
FIG. 6 shows a SEM picture of a fiber membrane corresponding to a heat-resistant layer in polymer composite membrane F2 obtained according to a comparison example 2 of the present specification after being baked at 180° C., where a magnification factor is 2000.

FIG. 6 is a SEM picture of the polymer composite membrane DF2 after being baked for 1 h at 170° C. It can be seen from the pictures that after being baked for 1 h at 150° C., the polymer composite membrane DF2 still contains a large quantity of pores, and a melting and membrane formation phenomenon does not occur.

Through testing, the transverse stretching strength and the longitudinal stretching strength of the PE membrane are respectively 132 Mpa and 138 MPa, the needling strength is 0.501 kgf, and the ion conductivity is 7.9 mS/cm. Moreover, the PE membrane is baked for 1 h at 120° C., 140° C., 160° C., and 180° C., transverse thermal shrinkage percentages are respectively 0.0%, 0.0%, 1.6%, and 3.5%, longitudinal thermal shrinkage percentages are respectively 0.0%, 0.0%, 2.1% and, 3.7%, and ion conductivities are respectively 7.9 mS/cm, 6.8 mS/cm, 20 mS/cm, and 20 mS/cm.

Embodiment 3 (Fabricating a Three-Layered Polymer Composite Membrane of PE Base Membrane-Ceramic Layer-Heat-Resistant Layer)

This embodiment is used to describe a polymer composite membrane and a method for fabricating same provided in the present specification.

(1) Preparing a ceramic membrane.

2 kg of aluminum oxide (whose average particle size is 400 nm), 0.1 kg of polyvinylidene fluoride (which is commercially available from Arkema Corporation and whose weight-average molecular weight is 450000 g/mol), and 500 kg of water are mixed, and stirred for 2 hours at 6000 rpm, to form a ceramic layer slurry. The ceramic layer slurry is applied onto one side surface of a PE base membrane whose thickness is 11 μm, and dried to obtain a ceramic layer whose thickness is 3 μm on the one side surface of the base membrane, and to obtain a product, e.g., a ceramic membrane.

(2) Preparing a heat-resistant fiber layer with reference to Embodiment 1. The difference is that, the porous membrane PE is replaced with the prepared ceramic membrane, and a heat-resistant layer is prepared by using the method in Embodiment 1 on a surface of a ceramic layer in the ceramic membrane, to prepare the polymer composite membrane F3, wherein the heat-resistant layer (whose thickness is 6 μm and porosity is 80%) is formed on.

(3) Structure and performance characteristics of the polymer composite membrane.

Through testing, the transverse stretching strength and the longitudinal stretching strength of the polymer composite membrane F3 are respectively 110 Mpa and 113 MPa, the needling strength is 0.535 kgf, and the ion conductivity is 6.9 mS/cm. The uniform distributed load (load borne on a unit width) of the polymer composite membrane F3 after being baked for 1 h at 160° C. is 0.20 N/mm. Moreover, the polymer composite membrane F1 is baked for 1 h at 120° C., 140° C., 160° C., and 180° C., transverse thermal shrinkage percentages are respectively 0.00%, 0.00%, 1.80%, and 4.60%, longitudinal thermal shrinkage percentages are respectively 0.00%, 0.00%, 3.10% and, 5.00%, and ion conductivities are respectively 6.8 mS/cm, 5.8 mS/cm, 3.5 mS/cm, and 2.3 mS/cm.

COMPARISON EXAMPLE 3

This comparison example is an independent comparison example of a ceramic membrane including a PE base membrane and a ceramic layer, and is used to comparatively describe a polymer composite membrane and a method for fabricating same provided in the present specification.

(1) Method for fabricating a ceramic membrane: the same as the method (1) for fabricating a ceramic membrane in Embodiment 1, and the obtained ceramic membrane is marked as DF3 (that is, the ceramic membrane obtained in Embodiment 1).

(2) Structure and performance characteristics of the polymer composite membrane.

Through testing, the transverse stretching strength and the longitudinal stretching strength of the polymer composite membrane DF3 are respectively 133 Mpa and 145 MPa, the needling strength is 0.512 kgf, and the ion conductivity is 7.8 mS/cm. The uniform distributed load (load borne on a unit width) of the polymer composite membrane DF3 after being baked for 1 h at 160° C. is 0.04 N/mm (the high-temperature tensile strength of the polymer composite membrane F3 is five times that of the polymer composite membrane DF3). Moreover, the polymer composite membrane DF3 is baked for 1 h at 120° C., 140° C., 160° C., and 180° C., transverse thermal shrinkage percentages are respectively 0.30%, 1.00%, 6.50%, and 86.0%, longitudinal thermal shrinkage percentages are respectively 0.50%, 1.50%, 5.50% and, 82.2%, and ion conductivities are respectively 7.8 mS/cm, 6.3 mS/cm, 20 mS/cm, and directly short-circuited.

Embodiment 4

This embodiment is used to describe a polymer composite membrane and a method for fabricating same provided in the present specification.

(1) Method for fabricating a ceramic membrane is the same as that in Embodiment 3, to obtain a ceramic membrane.

(2) Preparing a heat-resistant layer (including five heat-resistant sub-layers of different materials) with reference to Embodiment 3. The difference is that, A spinning polymer (for a specific raw material, refer to Table 3) and an optional dissolution promoter are added to N,N-dimethylacetamide (DMAc) (which is commercially available from Aladdin Reagent Co., Ltd., the same below), and N,N-dimethylacetamide (DMAc) is magnetically stirred in water bath at 70° C. to fully dissolve the spinning polymer and the dissolution promoter, to form spinning solutions A to E whose polymer (the foregoing AS) concentration is 15 wt %.

TABLE 3

| | Spinning polymer | Dissolution promoter (wt %) |
|---|---|---|
| Spinning solution A | AS | No |
| Spinning solution B | Mixture of AS and PMIA of a weight ratio 3:1 | Lithium chloride (0.4 wt % of PMIA) |
| Spinning solution C | Mixture of AS and PMIA of a weight ratio 1:1 | Lithium chloride (0.4 wt % of PMIA) |
| Spinning solution D | Mixture of AS and PMIA of a weight ratio 1:3 | Lithium chloride (0.4 wt % of PMIA) |
| Spinning solution E | PMIA | Lithium chloride (0.4 wt % of PMIA) |

One side surface of a PE base membrane of 11 μm wraps a roller (a collection device). On another side surface of the PE base membrane, electrostatic spinning is performed sequentially on the spinning solutions A to E by using a needle electrostatic spinning method, to prepare the polymer composite membrane F4 (whose thickness is 5 μm and porosity is 80%).

Five heat-resistant sub-layers are sequentially formed in the polymer composite membrane F4 outwards from a surface of the PE base membrane, and are respectively a heat-resistant sub-layer A (having a thickness of 1 μm and a pore-blocking temperature of 123° C.), a heat-resistant sub-layer B (having a thickness of 1 μm and a pore-blocking temperature of 138° C.), a heat-resistant sub-layer C (having a thickness of 1 μm and a pore-blocking temperature of 150° C.), a heat-resistant sub-layer D (having a thickness of 1 μm and a pore-blocking temperature of 204° C.), and a heat-resistant sub-layer E (having a thickness of 1 μm and a pore-blocking temperature greater than 250° C.).

(3) Structure and performance characteristics of the polymer composite membrane.

The diameter of the fiber in the SEM image is measured by using TEM Macrography software. The data is recorded, and an average fiber diameter is calculated as 192 nm. According to the gravimetric method, the surface density of the heat-resistant layer is calculated as 1.22 g/m². Moreover, through testing, the transverse stretching strength and the longitudinal stretching strength of the polymer composite membrane F4 are respectively 116 Mpa and 118 MPa, the needling strength is 0.534 kgf, and the ion conductivity is 6.7 mS/cm. Moreover, the polymer composite membrane F4 is baked for 1 h at 120° C., 140° C., 160° C., and 180° C., transverse thermal shrinkage percentages are respectively 0.00%, 0.00%, 2.00%, and 4.80%, longitudinal thermal shrinkage percentages are respectively 0.00%, 0.00%, 3.30% and, 5.50%, and ion conductivities are respectively 6.5 mS/cm, 5.7 mS/cm, 3.3 mS/cm, and 2.1 mS/cm.

Embodiment 5

This embodiment is used to describe a polymer composite membrane and a method for fabricating same provided in the present specification.

(1) Method for fabricating a ceramic membrane is the same as that in Embodiment 3, to obtain a ceramic membrane.

(2) Preparing a heat-resistant layer (including four heat-resistant sub-layers of different materials) with reference to Embodiment 3. The difference is that, A spinning polymer (for a specific raw material, refer to Table 4) and an optional dissolution promoter are added to N,N-dimethylacetamide (DMAc) (which is commercially available from Aladdin Reagent Co., Ltd., the same below), and N,N-dimethylacetamide (DMAc) is magnetically stirred in water bath at 70° C. to fully dissolve the spinning polymer and the dissolution promoter, to form spinning solutions A to D whose polymer (the foregoing AS) concentration is 15 wt %.

TABLE 4

|  | Spinning polymer | Dissolution promoter (wt %) |
|---|---|---|
| Spinning solution A | AS | No |
| Spinning solution B | Mixture of AS and PMIA of a weight ratio 2:1 | Lithium chloride (0.4 wt % of PMIA) |
| Spinning solution C | Mixture of AS and PMIA of a weight ratio 1:2 | Lithium chloride (0.4 wt % of PMIA) |
| Spinning solution D | PMIA | Lithium chloride (0.4 wt % of PMIA) |

One side surface of a PE base membrane of 11 μm wraps a roller (a collection device). On another side surface of the PE base membrane, electrostatic spinning is performed sequentially on the foregoing spinning solutions A to D by using a needle electrostatic spinning method, to prepare the polymer composite membrane F5 (whose thickness is 4 μm and porosity is 82%).

Four heat-resistant sub-layers are sequentially formed in the polymer composite membrane F5 outwards from a surface of the PE base membrane, and are respectively a heat-resistant sub-layer A (having a thickness of 1 μm and a pore-blocking temperature of 122° C.), a heat-resistant sub-layer B (having a thickness of 1 μm and a pore-blocking temperature of 142° C.), a heat-resistant sub-layer C (having a thickness of 1 μm and a pore-blocking temperature of 184° C.), and a heat-resistant sub-layer D (having a thickness of 1 μm and a pore-blocking temperature greater than 250° C.).

(3) Structure and performance characteristics of the polymer composite membrane, The diameter of the fiber in the SEM image is measured by using TEM Macrography software. The data is recorded, and an average fiber diameter is calculated as 192 nm. According to the gravimetric method, the surface density of the heat-resistant layer is calculated as 1.22 g/m². Moreover, through testing, the transverse stretching strength and the longitudinal stretching strength of the polymer composite membrane F5 are respectively 118 MPa and 120 MPa, the needling strength is 0.534 kgf, and the ion conductivity is 7.0 mS/cm. Moreover, the polymer composite membrane F5 is baked for 1 h at 120° C., 140° C., 160° C., and 180° C., transverse thermal shrinkage percentages are respectively 0.00%, 0.00%, 3.7%, and 7.2%, longitudinal thermal shrinkage percentages are respectively 0.00%, 0.00%, 4.3% and, 8.0%, and ion conductivities are respectively 7.0 mS/cm, 6.4 mS/cm, 5.9 mS/cm, and 5.3 mS/cm.

Embodiment 6

This embodiment is used to describe a polymer composite membrane and a method for fabricating same provided in the present specification.

(1) Method for fabricating a ceramic membrane is the same as that in Embodiment 5, to obtain a ceramic membrane.

(2) Preparing a heat-resistant layer (including four heat-resistant sub-layers of different materials) with reference to Embodiment 5. The difference is that, poly(m-phenylene isophthalamide) is replaced with a same use amount of polyetherimide PEI (which is commercially available from SABIC Corporation and whose melting point is 300° C. to 350° C.), and the styrene-acrylonitrile copolymer is replaced with a same use amount of polyvinylidene fluoride-hexafluoropropylene (PVDF-HFP) (which is commercially available from Solvay Corporation and whose melting point is 110° C. to 115° C., wherein the weight content of hexafluoropropylene is 10%) to prepare spinning solutions A to D whose concentration is 15 wt %, and the polymer composite membrane F6 (whose thickness is 4 μm and porosity is 85%) is prepared through an electrostatic spinning process.

Four heat-resistant sub-layers are sequentially formed in the polymer composite membrane F1 outwards from a surface of the PE base membrane, and are respectively a heat-resistant sub-layer A (having a thickness of 1 μm and a pore-blocking temperature of 112° C.), a heat-resistant sub-layer B (having a thickness of 1 μm and a pore-blocking temperature of 138° C.), a heat-resistant sub-layer C (having a thickness of 1 μm and a pore-blocking temperature of 180° C.), and a heat-resistant sub-layer D (having a thickness of 1 μm and a pore-blocking temperature greater than 250° C.).

(3) Structure and performance characteristics of the polymer composite membrane:

The diameter of the fiber in the SEM image is measured by using TEM Macrography software. The data is recorded, and an average fiber diameter is calculated as 192 nm. According to the gravimetric method, the surface density of the heat-resistant layer is calculated as 1.22 g/m². Moreover, through testing, the transverse stretching strength and the longitudinal stretching strength of the polymer composite membrane F1 are respectively 115 Mpa and 118 MPa, the needling strength is 0.531 kgf, and the ion conductivity is 6.8 mS/cm. Moreover, the polymer composite membrane F1 is baked for 1 h at 120° C., 140° C., 160° C., and 180° C., transverse thermal shrinkage percentages are respectively 0.00%, 1.00%, 1.50%, and 4.30%, longitudinal thermal shrinkage percentages are respectively 0.00%, 0.80%, 3.00% and, 4.50%, and ion conductivities are respectively 6.8 mS/cm, 5.2 mS/cm, 3.4 mS/cm, and 2.1 mS/cm.

Embodiment 7

This embodiment is used to describe a polymer composite membrane and a method for fabricating same provided in the present specification.

(1) Method for fabricating a ceramic membrane is the same as that in Embodiment 5, to obtain a ceramic membrane.

(2) Preparing a heat-resistant layer (including four heat-resistant sub-layers of different materials) with reference to Embodiment 5. The difference is that, poly(m-phenylene isophthalamide) is replaced with a same use amount of polyetherimide PEI (which is commercially available from SABIC Innovative Material Corporation and whose melting point is 300° C. to 350° C.), and the styrene-acrylonitrile copolymer is replaced with a same use amount of polyvinylidene fluoride-acrylate (PVDF-AA) (which is commercially available from Arkema Corporation and whose melting point is 120° C. to 125° C.), to prepare spinning solutions A to D whose concentration is 15 wt %, and the polymer composite membrane F6 (whose thickness is 3 μm and porosity is 82%) is prepared through an electrostatic spinning process.

(3) Structure and performance characteristics of the polymer composite membrane:

Four heat-resistant sub-layers are sequentially formed in the polymer composite membrane F1 outwards from a surface of the PE base membrane, and are respectively a heat-resistant sub-layer A (having a thickness of 0.5 μm and a pore-blocking temperature of 122° C.), a heat-resistant sub-layer B (having a thickness of 0.5 μm and a pore-blocking temperature of 136° C.), a heat-resistant sub-layer C (having a thickness of 0.5 μm and a pore-blocking temperature of 152° C.), and a heat-resistant sub-layer D (having a thickness of 1.5 μm and a pore-blocking temperature greater than 250° C.).

The diameter of the fiber in the SEM image is measured by using TEM Macrography software. The data is recorded, and an average fiber diameter is calculated as 192 nm. According to the gravimetric method, the surface density of the heat-resistant layer is calculated as 1.22 g/m$^2$. Moreover, through testing, the transverse stretching strength and the longitudinal stretching strength of the polymer composite membrane F1 are respectively 116 Mpa and 119 MPa, the needling strength is 0.531 kgf, and the ion conductivity is 6.8 mS/cm. Moreover, the polymer composite membrane F1 is baked for 1 h at 120° C., 140° C., 160° C., and 180° C., transverse thermal shrinkage percentages are respectively 0.00%, 0.90%, 1.40%, and 4.20%, longitudinal thermal shrinkage percentages are respectively 0.00%, 0.75%, 3.10% and, 4.55%, and ion conductivities are respectively 6.8 mS/cm, 4.9 mS/cm, 3.7 mS/cm, and 3.1 mS/cm.

Embodiment 8

This embodiment is used to describe a polymer composite membrane and a method for fabricating same provided in the present specification.

(1) Method for fabricating a ceramic membrane is the same as that in Embodiment 5, to obtain a ceramic membrane.

(2) Preparing a heat-resistant layer (including four heat-resistant sub-layers of different materials) with reference to Embodiment 5. The difference is that, poly(m-phenylene isophthalamide) is replaced with a same use amount of poly(p-phenylene-2,6-benzobisoxazole) PBO (which is Zylon commercially available from Ruiyan Corporation and whose melting point is 600° C. to 650° C.), and the styrene-acrylonitrile copolymer is replaced with a same use amount of polyvinylidene fluoride-hexafluoropropylene (PVDF-HFP) (which is commercially available from Arkema Corporation and whose melting point is 130° C., wherein the content of hexafluoropropylene is 10 wt %), to prepare spinning solutions A to D whose concentration is 15 wt %, and the polymer composite membrane F6 (whose thickness is 4 μm and porosity is 86%) is prepared through an electrostatic spinning process.

(3) Structure and performance characteristics of the polymer composite membrane:

Four heat-resistant sub-layers are sequentially formed in the polymer composite membrane F1 outwards from a surface of the PE base membrane, and are respectively a heat-resistant sub-layer A (having a thickness of 1 μm and a pore-blocking temperature of 130° C.), a heat-resistant sub-layer B (having a thickness of 1 μm and a pore-blocking temperature of 152° C.), a heat-resistant sub-layer C (having a thickness of 1 μm and a pore-blocking temperature of 196° C.), and a heat-resistant sub-layer D (having a thickness of 1 μm and a pore-blocking temperature greater than 250° C.).

The diameter of the fiber in the SEM image is measured by using TEM Macrography software. The data is recorded, and an average fiber diameter is calculated as 192 nm. According to the gravimetric, the surface density of the heat-resistant layer is calculated as 1.22 g/m$^2$. Moreover, through testing, the transverse stretching strength and the longitudinal stretching strength of the polymer composite membrane F1 are respectively 119 Mpa and 121 MPa, the needling strength is 0.531 kgf, and the ion conductivity is 6.7 mS/cm. Moreover, the polymer composite membrane F1 is baked for 1 h at 120° C., 140° C., 160° C., and 180° C., transverse thermal shrinkage percentages are respectively 0.00%, 0.00%, 0.00%, and 1.20%, longitudinal thermal shrinkage percentages are respectively 0.00%, 0.00%, 0.00% and, 2.10%, and ion conductivities are respectively 6.7 mS/cm, 5.9 mS/cm, 5.4 mS/cm, and 2.1 mS/cm.

Embodiment 9

This embodiment is used to describe a polymer composite membrane and a method for fabricating same provided in the present specification.

(1) Method for fabricating a ceramic membrane is the same as that in Embodiment 5, to obtain a ceramic membrane.

(2) Preparing a heat-resistant layer (including four heat-resistant sub-layers of different materials) with reference to Embodiment 5. The difference is that, poly(m-phenylene isophthalamide) is replaced with a same use amount of polyetherimide PEI (which is commercially available from SABIC Innovative Material Corporation and whose melting point is 300° C. to 350° C.), and the styrene-acrylonitrile copolymer is replaced with a same use amount of polyvinylidene fluoride-hexafluoropropylene (PVDF-HFP) (which is commercially available from Solvay Corporation and whose melting point is 120° C. to 130° C., where the weight content of hexafluoropropylene is 5%), to prepare spinning solutions A to D whose concentration is 15 wt %, and the polymer composite membrane F6 (whose thickness is 4 μm and porosity is 82%) is prepared through an electrostatic spinning process.

(3) Structure and performance characteristics of the polymer composite membrane.

Four heat-resistant sub-layers are sequentially formed in the polymer composite membrane F1 outwards from a surface of the PE base membrane, and are respectively a heat-resistant sub-layer A (having a thickness of 1 μm and a pore-blocking temperature of 125° C.), a heat-resistant sub-layer B (having a thickness of 1 μm and a pore-blocking temperature of 152° C.), a heat-resistant sub-layer C (having a thickness of 1 µm and a pore-blocking temperature of 182° C.), and a heat-resistant sub-layer D (having a thickness of 1 µm and a pore-blocking temperature greater than 250° C.).

The diameter of the fiber in the SEM image is measured by using TEM Macrography software. The data is recorded, and an average fiber diameter is calculated as 192 nm. According to the gravimetric method, the surface density of the heat-resistant layer is calculated as 1.22 g/m². Moreover, through testing, the transverse stretching strength and the longitudinal stretching strength of the polymer composite membrane F1 are respectively 116 Mpa and 118 MPa, the needling strength is 0.531 kgf, and the ion conductivity is 6.6 mS/cm. Moreover, the polymer composite membrane F1 is baked for 1 h at 120° C., 140° C., 160° C., and 180° C., transverse thermal shrinkage percentages are respectively 0.00%, 0.58%, 1.50%, and 2.90%, longitudinal thermal shrinkage percentages are respectively 0.00%, 0.42%, 2.10%, and 3.40%, and ion conductivities are respectively 6.3 mS/cm, 5.1 mS/cm, 4.3 mS/cm, and 2.1 mS/cm.

It can be known from test structures of the embodiments and comparison examples that, application of the polymer composite membrane, the method for fabricating same, and the lithium-ion battery including same according to the technical solutions of the present specification has the following benefits.

(1) The heat-resistant layer is formed by the plurality of heat-resistant sub-layers having the fiber network structures, a high porosity can be formed without creating additional pores, pores are distributed evenly, the porosity may be up to 80% to 90%, undesired phenomena such as polarization caused by uneven distribution of pores may be effectively prevented, and lithium-ion migration is not hindered.

(2) The heat-resistant sub-layers are prepared through the first heat-resistant polymer material and/or the second heat-resistant polymer material (whose melting point is higher than 100° C.), so that the thermal contraction percentage of the prepared heat-resistant layer is small at a high temperature (>160° C.), and the structure is stable.

(3) The plurality of heat-resistant sub-layers whose pore-blocking temperatures are sequentially increased is formed in the heat-resistant layer, so that softening and pore blocking occur in the heat-resistant sub-layers within different temperature ranges. Therefore, the composite membrane has a dynamic (periodic) pore blocking behavior. After pore blocking occurs at each heat-resistant sub-layer, the heat-resistant sub-layer may play a role of suppressing lithium-ion conduction (the ion conductivity is reduced at a high temperature), retarding reaction, and reducing reaction heat release, thereby well adapting to internal overheating of the battery, to effectively prevent thermal failure of the membrane caused by a pore unblocking phenomenon, so that the battery is safer at a high temperature.

Although implementations and embodiments of the present specification have been described in detail above with reference to the accompanying drawings, the present specification is not limited to specific details in the implementations and embodiments. Various variations can be made to the technical solutions of the present specification within the scope of the technical idea of the present specification, and such variations all fall within the protection scope of the present specification. It should be further noted that the specific technical features described in the implementations and embodiments can be combined in any appropriate manner having no confliction. To avoid unnecessary repetition, various possible combinations are not further described in the present specification.

In addition, any combination may be made between different implementations and embodiments of the present specification, and the combinations shall also be regarded as content disclosed by the present specification provided that it does not depart from the idea of the present specification.

What is claimed is:

1. A polymer composite membrane, wherein the polymer composite membrane comprises a porous base membrane and a heat-resistant layer covering at least one side surface of the porous base membrane, wherein the heat-resistant layer comprises N heat-resistant sub-layers sequentially stacked, where $3 \leq N \leq 10$, a thickness of each of the N heat-resistant sub-layers is 0.02 µm to 2 µm, pore-blocking temperatures of the N heat-resistant sub-layers are sequentially increased from inside to outside, each of the N heat-resistant sub-layers comprises at least one of a first heat-resistant polymer material and a second heat-resistant polymer material, each of the N heat-resistant sub-layers has a respective fiber network structure, a diameter of a fiber in the N heat-resistant sub-layers is 100 nm to 2000 nm, and wherein a melting point of the first heat-resistant polymer material is not less than 200° C., and a melting point of the second heat-resistant polymer material is not less than 100° C.

2. The polymer composite membrane according to claim 1, wherein a pore-blocking temperature of a first heat-resistant sub-layer on an innermost side of the heat-resistant layer is not less than 100° C., and a pore-blocking temperature of an $N^{th}$ heat-resistant sub-layer is not less than 200° C.

3. The polymer composite membrane according to claim 2, wherein the pore-blocking temperature of the first heat-resistant sub-layer is 100° C. to 130° C., and the pore-blocking temperature of the $N^{th}$ heat-resistant sub-layer is not less than 250° C.

4. The polymer composite membrane according to claim 2, wherein a pore-blocking temperature of an $(N-1)^{th}$ heat-resistant sub-layer in the heat-resistant layer is not less than 180° C.

5. The polymer composite membrane according to claim 4, wherein the pore-blocking temperature of the $(N-1)^{th}$ heat-resistant sub-layer in the heat-resistant layer is 180° C. to 200° C.

6. The polymer composite membrane according to claim 1, wherein a thickness of the heat-resistant layer is 0.5 µm to 30 µm, and wherein a porosity of the heat-resistant layer is 80% to 95%.

7. The polymer composite membrane according to claim 1, wherein a surface density of the N heat-resistant sub-layer is 0.1 g/m² to 5 g/m².

8. The polymer composite membrane according to claim 1, wherein the N heat-resistant sub-layers are made of same first heat-resistant polymer materials and same second heat-resistant polymer materials, from inside to outside, contents of the first heat-resistant polymer materials are sequentially increased, and contents of the second heat-resistant polymer materials are sequentially reduced, wherein based on a total weight of each of the N heat-resistant sub-layers, in each of the N heat-resistant sub-layers, the content of the first heat-resistant polymer material is $(n-1)/(N-1) \times 100\%$, and the content of the second heat-resistant polymer material is $(N-n)/(N-1) \times 100\%$, and wherein n is an index number of one of the N heat-resistant sub-layers in the direction from inside to outside.

9. The polymer composite membrane according to claim 1, wherein when each of the N heat-resistant sub-layers comprises both a first heat-resistant polymer material and a second heat-resistant polymer material, the first heat-resistant polymer material is blended with the second heat-resistant polymer material, and wherein the first heat-resistant polymer material is selected from one or more of poly(p-phenylene terephthalamide), poly(m-phenylene isophthalamide), poly(p-benzamide), poly(p-phenylene-2,6-benzobisoxazole), poly(p-phenylene benzobisthiazole), poly(benzothiazole), poly(benzimidazole), copoly(ether ketone), poly(benzoxazole), polyetherimide, poly(ether ketone), and polyimide, and the second heat-resistant polymer material is selected from one or more of modified polyvinylidene fluoride, polystyrene, polyacrylate, polyethylene oxide, polyvinyl alcohol, polyacrylonitrile, a styrene-acrylonitrile copolymer, polyvinylpyrrolidone, and a vinylpyrrolidone-styrene copolymer.

10. The polymer composite membrane according to claim 9, wherein the first heat-resistant polymer material is selected from one or more of poly(p-phenylene terephthalamide), poly(m-phenylene isophthalamide), poly(p-phenylene-2, 6-benzobisoxazole), poly(p-benzamide), and polyimide, the modified polyvinylidene fluoride is selected from one or more of polyvinylidene fluoride-hexafluoropropylene and polyvinylidene fluoride-acrylate, and the polyacrylate is selected from one or more of polymethyl acrylate, polyethyl acrylate, and polymethyl methacrylate.

11. The polymer composite membrane according to claim 1, wherein the porous base membrane includes a first polymer base membrane or a ceramic membrane, and the ceramic membrane comprises a second polymer base membrane and a ceramic layer that is formed on at least one side surface of the second polymer base membrane, and the second polymer base membrane includes a polyolefin membrane.

12. The polymer composite membrane according to claim 1, wherein the porous base membrane includes a ceramic membrane, and the heat-resistant layer is located on a side surface of the ceramic membrane on which a ceramic layer is formed.

13. A method for fabricating a polymer composite membrane, comprising:
providing a polymer base membrane;
forming precursors of N heat-resistant sub-layers sequentially superposed on at least one side surface of the polymer base membrane through an electrostatic spinning method using a spinning solution, wherein the spinning solution contains a first heat-resistant polymer material and/or a second heat-resistant polymer material;
drying; and
removing a solvent to obtain a heat-resistant layer comprising the N heat-resistant sub-layers, wherein $3 \leq N \leq 10$, a thickness of each of the N heat-resistant sub-layers is 0.02 μm to 2 μm, a diameter of a fiber in the N heat-resistant sub-layers is 100 nm to 2000 nm, a melting point of the first heat-resistant polymer material is not less than 200° C., a melting point of the second heat-resistant polymer material is not less than 100° C., and pore-blocking temperatures of the N heat-resistant sub-layers are sequentially increased in a direction from inside to outside along the heat-resistant layer.

14. The fabrication method according to claim 13, wherein a pore-blocking temperature of a first heat-resistant sub-layer located on an innermost side of the heat-resistant layer is not less than 100° C., a pore-blocking temperature of an $N^{th}$ heat-resistant sub-layer is not less than 200° C., and a pore-blocking temperature of an $(N-1)^{th}$ heat-resistant sub-layer in the heat-resistant layer is not less than 180° C.

15. The fabrication method according to claim 13, wherein a thickness of the heat-resistant layer is 0.5 μm to 30 μm, a porosity of the heat-resistant layer is 80% to 95%, and a surface density of the heat-resistant sub-layer is 0.1 g/m² to 5 g/m².

16. The fabrication method according to claim 13, wherein
the N heat-resistant sub-layers are made of same first heat-resistant polymer materials and same second heat-resistant polymer materials,
in the N heat-resistant sub-layers, from inside to outside, contents of the first heat-resistant polymer materials are sequentially increased, and contents of the second heat-resistant polymer materials are sequentially reduced, and
based on a total weight of each of the N heat-resistant sub-layers, in each of the N heat-resistant sub-layers, the content of the first heat-resistant polymer material is $(n-1)/(N-1) \times 100\%$, and the content of the second heat-resistant polymer material is $(N-n)/(N-1) \times 100\%$, wherein n is an index number of one of the N heat-resistant sub-layers in the direction from inside to outside.

17. The fabrication method according to claim 13, wherein when each of the N heat-resistant sub-layers comprises both a first heat-resistant polymer material and a second heat-resistant polymer material, forming the precursor of the N heat-resistant sub-layers comprises:
dissolving both the first heat-resistant polymer material and the second heat-resistant polymer material in the solvent, to form a mixed spinning solution, and performing electrostatic spinning on the mixed spinning solution to form the corresponding precursor of the N heat-resistant sub-layers; or
separately fabricating a spinning solution A containing the first heat-resistant polymer material and a spinning solution B containing the second heat-resistant polymer material, and performing electrostatic spinning using both the spinning solution A and the spinning solution B to form the corresponding precursor of the N heat-resistant sub-layers.

18. The fabrication method according to claim 13, wherein conditions of the drying comprise:
a drying temperature of 40° C. to 60° C., and a drying time of 5 min to 30 min; and
a mechanical rolling on the prepared heat-resistant layer at a pressure of 5 MPa to 10 MPa for 3 minutes to 5 minutes.

19. A lithium-ion battery, comprising an anode, a cathode, and a battery membrane located between the anode and the cathode, wherein the battery membrane is a polymer composite membrane, wherein the polymer composite membrane comprises a porous base membrane and a heat-resistant layer covering at least one side surface of the porous base membrane, wherein the heat-resistant layer comprises N heat-resistant sub-layers sequentially stacked, where $3 \leq N \leq 10$, a thickness of each of the N heat-resistant sub-layers is 0.02 μm to 2 μm, pore-blocking temperatures of the N heat-resistant sub-layers are sequentially increased from inside to outside, each of the N heat-resistant sub-layers comprises at least one of a first heat-resistant polymer material and a second heat-resistant polymer material, each of the N heat-resistant sub-layers has a respective fiber network structure, a diameter of a fiber in the N heat-resistant sub-layers is 100 nm to 2000 nm, and wherein a melting point of the first heat-resistant polymer material is not less than 200° C., and a melting point of the second heat-resistant polymer material is not less than 100° C.

* * * * *